(12) United States Patent
Schumacher et al.

(10) Patent No.: US 9,494,199 B2
(45) Date of Patent: Nov. 15, 2016

(54) ROLLING BOOT WITH TRANSITION REGION

(71) Applicant: GKN Driveline International GmbH, Lohmar (DE)

(72) Inventors: Ralf Schumacher, Cologne (DE);
Winfried Busch, Hennef (DE);
Markus Deisinger, Siegburg (DE);
Joachim Wette, Hennef (DE);
Wolfgang Hildebrandt, Siegburg (DE);
Thomas Schafferus, Rheinberg (DE);
Achim Schmeink, Lohmar (DE)

(73) Assignee: GKN Driveline International GmbH, Lohmar (DE)

( * ) Notice: Subject to any disclaimer, the term of this patent is extended or adjusted under 35 U.S.C. 154(b) by 43 days.

(21) Appl. No.: 14/534,504

(22) Filed: Nov. 6, 2014

(65) Prior Publication Data

US 2015/0119152 A1 Apr. 30, 2015

Related U.S. Application Data

(63) Continuation of application No. PCT/EP2012/002108, filed on May 16, 2012.

(51) Int. Cl.
*F16D 3/84* (2006.01)
*F16D 3/205* (2006.01)

(52) U.S. Cl.
CPC .............. *F16D 3/845* (2013.01); *F16D 3/2055* (2013.01); *Y10S 464/905* (2013.01)

(58) Field of Classification Search
CPC ... F16D 3/845; F16D 3/2055; Y10S 464/905

USPC .......................... 464/111, 173, 905; 277/635
See application file for complete search history.

(56) References Cited

U.S. PATENT DOCUMENTS

| 3,511,061 A | 5/1970 | Burkhardt |
| 4,456,269 A * | 6/1984 | Krude ...................... F16J 3/043 |

(Continued)

FOREIGN PATENT DOCUMENTS

| JP | H11190358 A | 7/1999 |
| JP | 2009228727 A | 10/2009 |

(Continued)

OTHER PUBLICATIONS

International Search Report dated Mar. 14, 2013 (4 pages).

(Continued)

*Primary Examiner* — Gregory Binda
(74) *Attorney, Agent, or Firm* — Bejin Bieneman PLC

(57) ABSTRACT

A rolling boot comprises a first fastening region for fastening the boot to a joint casing, a second fastening region for fastening the boot to a shaft, and a fold region between the first and the second fastening region with a first fold near to the first fastening region and a second fold near to the second fastening region. The boot further comprises, between the first fastening region and the first fold, a first transition region comprising a first flange neighboring the first fastening region with a bottom. A ratio between a first minimal diameter $D_1$, defined by the bottom of the first flange of the first transition region, and a second maximal diameter $D_2$, defined by the first fold, where both are viewed in a longitudinal section direction along the main axis, is between approximately 1:1.01 to approximately 1:1.25.

18 Claims, 11 Drawing Sheets

(56) References Cited

U.S. PATENT DOCUMENTS

2010/0320702 A1* 12/2010 Takabe .................. F16J 3/042
2011/0089644 A1    4/2011 Hoets et al.

FOREIGN PATENT DOCUMENTS

| JP | 2011523002 A | 8/2011 |
|----|--------------|--------|
| JP | 2011525230 A | 9/2011 |
| WO | 0188399 A1 | 11/2001 |
| WO | 2005073583 A1 | 8/2005 |
| WO | 2009066128 A1 | 5/2009 |
| WO | 2009155955 A1 | 12/2009 |

OTHER PUBLICATIONS

Written Opinion of the International Searching Authority (4 pages).

* cited by examiner

ROLLING BOOT WITH TRANSITION REGION

CROSS-REFERENCE TO RELATED APPLICATIONS

This application is a continuation application of, and accordingly claims priority to, PCT International Application No. PCT/EP2012/002108 (filed May 16, 2012), the entire contents of which prior application is incorporated herein by reference.

BACKGROUND AND SUMMARY

A rolling boot comprises a first fastening region for fastening the boot to a joint casing, a second fastening region for fastening the boot to a shaft, and a fold region between the first and the second fastening region with a first fold near to the first fastening region and a second fold near to the second fastening region. Further disclosed is a plunge joint with a rolling boot in accordance with the present disclosure, as well as a joint arrangement with at least one rolling boot, and a shaft.

Rolling boots in accordance with the present disclosure may be used especially for plunge joints, for example in the form of a ball-and-socket joint or trilobe joint, and especially for constant velocity joints, all of them, e.g., in an embodiment as a plunge joint. Rolling boots are also referred to as diaphragm boots; however, the term rolling boot will be used herein.

Rolling boots, in contrast to convolute boots, only have a fold region with two folds, one of them having a convex shape, and the other having a concave shape. Said two folds show a straight through their peak region that is more or less parallel to a main axis of the boot, if viewed in a longitudinal section, and that divides the folds approximately in half. In convolute boots, to the contrary, such a straight is more or less perpendicular to such a main axis. The present disclosure only relates to such rolling boots, and not to convolute boots.

Rolling boots are mounted on joint casings by way of a binder element, also called a tensioning element, being also used to fix said boots on a shaft in the second fastening region which is oppositely arranged from the first fastening region in the boot in accordance with the present disclosure. Such boots are usually made of a thermoplastic elastomer material or mixtures of thermoplastic elastomer materials, for example based on polyurethane (TPU), polyamide (TPA), polyolefins (TPO), polyester (TPEE), thermoplastic elastomer vulcanisate (TPV), or a thermoplastic poly-ether-ester-elastomer (TPC-ET). The material or mixtures of materials of the boots in accordance with the present disclosure may be made of or may further comprise other materials, especially additives like diffusion-promoting admixtures or any other additives a person skilled in the art will be aware of in view of the use of the boot in question, especially in view of the demands of the automotive industry if the boots are used for automotives. However, the boots in accordance with the present disclosure may also be made of usual rubber-elastic materials.

WO 2009/155955 A1 discloses a rolling boot for mounting on a joint casing. If the joint will be a trilobe joint, it will be necessary to use in addition an adapter to fasten said rolling boot to the joint casing. Said rolling boot disclosed in WO 2009/155955 A1 shows a certain design for a first fold with an angle α, measured between an outer base surface of a transition region and an outer side of a first fold flank of said first fold, being in a range between 90° to 140°. The first fold has a very special design, especially of the fold peak region having the shape of a sharp nose. The object to be solved by said rolling boot is to provide for a rolling boot withstanding grease pressure acting on the rolling boot during use. Said rolling boot is of compact design and has a reduced inside diameter, thereby reducing the grease pressure acting on the rolling boot when it is exposed to centrifugal forces.

However, due to said special design, the rolling boot disclosed in WO 2009/155955 A1 has a decreased form stability in use, especially at higher revolutions per minute. Due to said decreased form stability, it is necessary to provide for retention rings for hindering any disassembly of a joint arrangement, and is further necessary to provide for means in a joint arrangement, for example shaft spring means as disclosed in WO 2009/066128 A1, to urge the shaft toward a predetermined position with respect to the joint inner parts, the latter also called male member of a joint. In addition, WO 2009/066128 A1 discloses first actual fixing means fixing the male member on the shaft in the axial direction with respect to a central axis.

Accordingly, disclosed herein is a rolling boot as well as a plunge joint and a joint arrangement comprising such a rolling boot showing increased form stability compared to rolling boots known from the state of the art.

For example, a boot as defined above comprises further, between the first fastening region and the first fold, a first transition region comprising a first flange neighbouring, e.g., directly arranged at, the first fastening region with a bottom, wherein a ratio between a first minimal diameter $D_1$, defined by the bottom of the first flange of the first transition region, and a second maximal diameter $D_2$, defined by the first fold, both if viewed in a longitudinal section along the main axis of the boot, is between approximately 1:1.01 to approximately 1:1.25, e.g., to 1:1.18, further, e.g., between approximately 1:1.02 to approximately 1.12, and yet further, e.g., between approximately 1:1.03 to approximately 1:1.09. Due to the radial symmetric embodiment of the rolling boot of the present invention, it will be seen that a bottom of the first flange of the first transition region may also be defined as the top surface of a rib being arranged at least in part at the inner circumference of the boot. From this it is clear that the diameter $D_1$ is the distance between the bottom of the first flange measured inside the boot in accordance with the present invention. The second maximal diameter $D_2$, as defined by the first fold, is defined by the outside maximum of the first fold defined in relation to the main axis of the boot. In a mathematical sense, one may define said maximum of a first fold being a kind of a turning point of said first fold, being the outside maximum turning point with respect to the main axis of the boot. Both diameters are defined in view of a boot in an unassembled condition.

In a further embodiment the first transition region provides for at least in part with respect to the circumference of the boot an angle α in a region between approximately 30° to 89.8°, e.g., in a region between approximately 56° to approximately 86°, further, e.g., in a region between approximately 60° to approximately 82°, and yet further, e.g., in a region between approximately 62° to approximately 80°.

As used herein, the term "approximately" is to be understood in that values so referred to are not limited to the exact value, but rather that also small deviations from the referred-to value shall be encompassed. Especially, deviations of +/−5%, or more especially, +/−2%, and yet further +/−1%, are within the scope of the term "approximately" in reference to the value in question. It has to be noted that the upper limit of 89.8° is not defined as being approximately 89.8°, meaning that the upper value 89.8° is an exact value defining the end of the range defined.

The meaning of the term " . . . at least in part with respect to the circumference of the boot an angle α . . . is provided for . . . " is that it is also possible that the rolling boot in accordance with the present invention may have protuberances on the outer circumference of the boot in the region of the first transition region, wherein such protuberances may act for encompassing rollers of a plunge joint. If such protuberances are arranged around the circumference of the boot in question in the first transition region and have a conical shape, thus presenting the second flange, then in the part of the first transition region between said protuberances, an angle α will be measured.

The first flange of said first transition region is, e.g., arranged at an essentially right angle with respect to an inner surface of the first fastening region, e.g., at a right angle. However, also other angles are possible, if the joint outer part on which the boot is to be mounted may have a joint front edge being not arranged in an essentially right angle. The first flange of the boot in accordance with the present invention will, e.g., be in direct contact with the surface of the front edge of the joint outer part, e.g., at least 70% of said inner surface will be in direct contact with the surface of the front edge of the joint outer part.

The rolling boot disclosed herein may especially be used for ball-and-socket plunge joints or plunge joints with a trilobe inner contour. Thus, the rolling boot may be used in addition to an adapter for adaptation on a trilobe embodied joint casing. However, the inner contour of the rolling boot could be already adapted to the trilobe outer contour of a joint casing in case of a trilobe plunge joint, especially a trilobe constant velocity joint, in order to avoid use of any adapter.

In the context of the present disclosure, the term "first transition region" is to be understood as a region neighbouring the first fastening region, e.g., neighbouring immediately the first fastening region. It starts with the first flange, being arranged e.g., at an essentially right angle with respect to an inner surface of said first fastening region. If referred to a joint casing, said first flange may be described as encompassing in part the front of the joint casing directed towards the fold region of the rolling boot.

The term "arranged at an essentially right angle" in the context of the present disclosure means that although it is preferred that the angle between the outer surface of said first flange and an inner surface, or a straight prolongating said inner surface, of the first fastening region, is 90°, that also deviations from the are encompassed. For example, deviations of said right angle of +/−5%, further preferred +/−2%, are within the meaning of said term.

The end region of the first transition region may be defined by the second flange of the boot having the conical shape, if viewed in the longitudinal section along the main axis of the boot, neighbouring, e.g., immediately neighbouring, the first curved part of the first fold of the fold region of the claimed rolling boot.

The angle α is defined by said outer surface of said first flange of the claimed boot being arranged at an essentially right angle with respect to said inner surface of said first fastening region, and an outer surface of said second flange having a conical shape. From said first transition region, a cylindrical part, arranged between the first flange and the second flange, may also be comprised. In case such a cylindrical part between the first and the second flange of the first transition region is present, said angle α is measured between a parallel of said outer surface of said first flange, going through the starting point of the second flange with the conical shape.

An advantage of the presently disclosed boot is that it provides for an increased form stability, including if no outer or inner reinforcing ribs are present. However, outer and/or inner reinforcing ribs may be present between the first fold and the transition region, or within the first fold, or between the first and the second fold within the boot, respectively. The reinforcing ribs may be arranged, for example, alternatively within the boot and outside the boot. It is also possible that only outer reinforcing ribs, or only inner reinforcing ribs, are present. For example, 6, 8, 10, or 12 outer and/or inner reinforcing ribs may be present.

Further due to said increased form stability, a disassembly of the inner parts of a joint is hindered, i.e., due to the high retention force imparted by the boot of the present disclosure. Thus, the risk of disassembly of the inner parts of a joint through bending or plunging at high angles will be diminished.

Further, due to the high form stability imparting high retention forces, the rolling boot in accordance with the present disclosure may be in a position to provide for an axial centering of a shaft in a plunge joint, so that retention rings or spring means or other means known from the state of the art may be omitted. In that respect, and compared to convolute boots, also the decreased air volume within the boot support said axial centering. The ratio of a grease amount to be included in a joint arrangement with the rolling boot in accordance with the present disclosure versus a residual air volume within the boot can be used to optimize the retention behaviour of such a joint arrangement.

In a further embodiment, a radius $r_M$, derived from diameter $D_1$, is essentially identical to a smallest radius $r_L$ of the claimed rolling boot, if said rolling boot will have a trilobe inner contour in order to be fixed on a trilobe joint casing without the need of any adapter, or the smallest diameter provided for by such a trilobe adapter, if the rolling boot will not have a trilobe inner contour in the first fastening region.

If the ratio between diameters $D_1$ and $D_2$ will be within the range as claimed, advantageously the production of the rolling boot in question will be simplified, because the geometry of the claimed boot will show a limited undercut, especially if the angle α will be within approximately 60° to approximately 82°. Further, a maximum for the retention force will be provided for with a ratio between diameters $D_1$ and $D_2$ as defined before.

In accordance with a further embodiment, between the second fold and the second fastening region a second transition region with a conical part with decreasing diameter d towards the second fastening region is comprised. The diameter d referring to the conical part of the second transition region is defined by opposing inner surfaces of the conical part. The conical part of the second transition region is defined as a part of the second transition region without any curved parts, and, further, having, e.g., an essentially steadily decreasing diameter, starting from the fold region towards the second fastening region. In an embodiment, the second transition region only comprises said conical part.

By the provision of said second transition region, the boot will be in a position to brace against the shaft, without creating negative effects such as knocking within the joint agreement.

In a further embodiment, the boot comprises a transition from the second transition region to the second fastening region, the transition being essentially continuous. "Essentially continuous" as used herein means that, without any step or any stage, the second fastening region is attached to the second transition region. Especially, said transition is stage- or stepless. However, a kind of a bead or rib or accumulation of material may be formed at the transition between the second transition region and the second fastening region, e.g., having a smoothed outer contour, for example a curved contour. All of the aforesaid refers to the inner side of the presently-disclosed boot. The transition, thus, is located on the inside surface of the material of the boot in the region where the second fastening region is attached to the second transition region. For example, no protrusion, accumulation of material of each kind, and so on, are present at the transition, so that said transition is in fact stage- or stepless. The aforesaid definition of the transition does not exclude that the thickness of the material of the boot in the second fastening region may be greater than the thickness of the material of the boot in the second transition region.

In a further embodiment, a thickness of the boot material varies from the first transition region to the second transition region. Thus, also the thickness of the boot material within the first transition and/or the second transition region itself may vary. For example, the thickness varies in a region between approximately 0.5 mm to approximately 3 mm, preferred, e.g., in a region between approximately 0.8 mm to approximately 2 mm.

In a further embodiment, the thickness of the boot material decreases within the first fastening region. Further, e.g., the thickness of the boot material varies within said second fold. Yet further, e.g., a minimum of the thickness of the boot material lies within said second fold.

The variation of the thickness of the boot material, e.g., in the regions as defined before, allows a fine tuning of the retention force, and, thus, the form stability of the boot claimed. The boot in use provides for two different ranges of operation that may be measured and visualized in a force/path diagram. For example, a first range A of operation exists, where in use the forces, especially the axial force, will only increase slightly, whereas a second range of operation B immediately neighbouring said first range of operation will be present in which the forces, especially the axial force, will increase drastically, practically ad infinitum. Due to said second range of operation B, the boot in accordance with the present disclosure will have the ability for axial centering of shafts in joints, especially plunge joints. The variation of the thickness of the boot material, especially in the regions as mentioned before, will allow also a fine tuning of said force/path abilities, i.e., of the first and the second range of operation, of the claimed boot.

In a further embodiment, if the boot is mounted on a plunge joint, at a maximal plunge radius $r_2$ of said second fold goes ad infinitum, so that a progressively increasing axial force of said boot practically increases ad infinitum. Alternatively, one may say that the boot, thus prevents a disassembly of a joint on which the boot may be fixed. The aforesaid refers to the boot in accordance with the present disclosure in an extended state, where the shaft is pulled out as far as possible from the plunge joint casing. Such a boot will also show a first and a second range of operation A and B, respectively. Advantageously, the disassembly of the plunge joint will be hindered due to the maximal axial force acting on the boot in accordance with the present disclosure, and, thus, on a joint on which such a boot is mounted.

For example, the first fold of the fold region of the claimed boot is of convex shape. Further, e.g., the second fold of the fold region of the claimed boot is of concave shape. The geometrical design both of the first fold or the second fold may be further used for fine tuning the form stability of the boot in question. Especially, the second fold may have a radial, ellipsoidal, clotoidal, cosh-like or evolente-like geometry. For example, the second fold will have an essentially radial geometry. Further for example, the first fold will have an essential radial geometry.

The geometry of the first fold can be defined as essentially in the form of a semi-circle. Further, the second fold has, e.g., a radial geometry, and is embodied in an essentially semi-circle way. The latter especially holds if one would neglect the transition between the first fold and the second fold.

In a further embodiment, an angle $\beta$ referring to the second transition region is in a range between approximately 0.5° to approximately 12°, more e.g., in a range between approximately 1° to approximately 10°, and most e.g., in a range between approximately 1.5° to approximately 7.5°. Said angle $\beta$ is measured in accordance with the present disclosure between a straight defined by an inner surface of the second fastening region, and an inner surface of the conical part of the second transition region. The ratio of length of said conical part of the second transition region ($L_1$) and a length of the second flange having a conical shape of the first transition region ($L_2$), is in a range between 10:1 to 2:1, e.g., in a range of approximately 3:1 to approximately 4:1. The length $L_2$ of the second flange of the first transition region as well as the length $L_1$ of the conical part of the second transition region is measured in relation to the main axis of the boot, if viewed in a longitudinal section. Within the aforesaid definded ratios, it will be possible to avoid contact with the second fastening region, and especially the clamp, especially any clamp ear, being mounted in the second fastening region for mounting the boot on a shaft, and/or any kind of projections in the form of beads or earlike projections, being arranged on the outer surface of the second fastening region, at maximum articulation angles of a joint arrangement in which the boot in accordance with the present disclosure will be mounted. However, as the case may be, also ratios $L_1$:$L_2$ of 1:1 to 1:5 are within the scope of the present disclosure, especially if the boot will be used for propshafts.

In a further preferred embodiment of the present disclosure, a ratio of an inner radius $r_1$ of the first fold and an inner radius $r_2$ of the second fold is in a range of approximately 1:1 to approximately 1:40, e.g., in a range of approximately 1:2 to approximately 1:10. Said radius $r_1$ and $r_2$ are measured with respect to an inner contour of the first and second fold. If the geometrical design of the first and/or second fold will not be a radial design, making it easy to define radius $r_1$ and $r_2$, the aforesaid ratio will be defined by the maximum radius of curvature, for example if the first and/or second fold have an ellipsoidal or clotoidal geometry. Said ratio may also be used to fine tune the first and second range of operation of the boot claimed with respect to the form stability, especially as expressed by the retention force.

In a further preferred embodiment of the present disclosure, a ratio between the first minimal diameter $D_1$ and a third diameter $D_3$, defined by a straight, the straight being defined by an inner surface of the first fastening region of a first binder seat region of the claimed boot, is between approximately 65% to approximately 95% (app. 0.65:1 to app. 0.95:1), further preferred between approximately 72% to approximately 85%. If the boot is designed for ball-and-socket plunge joints, thus not having a trilobe contour, then the definition of the third diameter $D_3$ is quite clear. If, however, the boot is designed with a trilobe contour, then it is assumed that the third diameter $D_3$ is equal twice the distance between the main axis of the boot, if viewed in a longitudinal section, and the straight being defined by the inner surface by the first binder seat region in a non-trilobe part of the boot, where the distance is at its maximum. Also, third diameter $D_3$ is defined in view of an unassembled boot.

The present disclosure further refers to a plunge joint with a rolling boot as defined above, especially a constant velocity joint, being construed as a trilobe joint or a ball joint. For example, the plunge joint can be a trilobe constant velocity joint, and the rolling boot can have a trilobe inner contour in the first fastening region, so that it is not necessary to use additionally an adapter. In such an arrangement, the first flange of the first transition region of the rolling boot, e.g., protrudes over an inner surface of the front edge of the joint casing, if viewed in a longitudinal section along the main axis of the boot, towards the interior of the boot. By this arrangement, a possible disassembly of the plunge joint will additionally be hindered. Further, such a protuberance of the bottom of the first flange of the first transition region over the inner surface of the front edge of a joint casing of said plunge joint will be observed in the un-lobe regions; if the plunge joint will be of trilobe contour.

Advantageously, a combination of the rolling boot in question with a plunge joint will lead to a kind of an automatical axial centering of a shaft to be inserted in such an arrangement.

Finally, the present disclosure also refers to a joint arrangement with at least one rolling boot in accordance with the present disclosure, with at least one plunge joint, and a shaft. For example, the at least one rolling boot can be mounted under tension. For example, the joint arrangement can comprise two plunge joints and at least one, e.g., two, rolling boots in accordance with the present disclosure. Further, the joint arrangement can comprise one plunge joint and one fixed joint, and at least one rolling boot. Exemplary joint arrangements are as follows:

- a shaft with two plunge joints, e.g., tripode plunge joints, with two rolling boots in accordance with the present disclosure;
- a shaft with two plunge joints, e.g., tripode plunge joints, with one rolling boot in accordance with the present disclosure, and one convolute (or diaphragm) boot or any other boot with decreased form stability, especially decreased axial retention force, compared to the rolling boot in accordance with the present disclosure;
- a shaft with a fixed joint with a convolute (or diaphragm) boot and a plunge boot, e.g., a tripode plunge boot, with the rolling boot in accordance with the present disclosure, where the rolling boot is mounted under tension;
- a shaft with two plunge joints, especially tripode plunge joints, and two rolling boots in accordance with the present disclosure, wherein both rolling boots are mounted under tension so that their overall length is shortened, compared to their length in an unmounted state;
- a shaft as defined before, however, both rolling boots are mounted under tension in an expanded way, so that their mounted length is increased compared to their length in an unmounted state; and
- a shaft with two plunge joints, especially tripode plunge joints, and with two rolling boots in accordance with the present disclosure, wherein both rolling boots are mounted under tension, namely one rolling boot with shortened length, and the other boot with increased length, compared to their length in an unmounted state;

If a shaft with two plunge joints and two rolling boots in accordance with the present disclosure is provided, the boots not being mounted under tension, the axial force as well as the plunge path is distributed in an essentially equal way or in both rolling boots. If one rolling boot is mounted with shortened length, the other with increased length, one of the plunge joints will be urged in a retracted end position.

In the embodiment with two plunge joints, one rolling boot in accordance with the present disclosure and one convolute or diaphragm or any other boot with lesser form stability, especially lesser retention force, will lead to the plunge joint with the mounted convolute boot or any other boot with lesser form stability, compared to the rolling boot in question, mainly carrying out any movements of the shaft, whereas the other plunge joint with the mounted rolling boot in accordance with the present disclosure only provides for no or only little axial movements, thus acting similar to a fixed joint. The latter is due to the higher form stability of the rolling boot in question.

In the embodiment with the fixed joint with a convolute (or diaphragm) boot and the plunge joint with the rolling boot in accordance with the present disclosure, due to the axial force of the rolling boot in accordance with the present disclosure, the fixed joint will be pretightend in an axial way, so that the axial movement within the fixed joint will be compensated.

Other advantages and features of the disclosed subject matter will become apparent to one of skill in the art reading the following detailed description with reference to the drawings and illustrating various features by way of example only.

BRIEF DESCRIPTION OF THE DRAWINGS

Reference should now be made to embodiments illustrated in greater detail in the accompanying drawings as describe below by way of example.

In the drawings.

DETAILED DESCRIPTION

While the present disclosure is described with respect to a rolling boot having a trilobe inner contour in the first fastening region, the present disclosure may be adapted and utilized for other rolling boots having another inner contour in the first fastening region.

In the following detailed description of the drawings, special orienting terms are used such as "outside", "inside", "opposite" and "the like". It is to be understood that these terms are used for convenience of description of the components or embodiments by reference to the drawings. These terms do not necessarily describe the absolute location and space, such as upward, downward, left, right, et cetera, that any part must assume. Further, in the following description, various operating parameters and components are described for several constructed embodiments. These specific parameters and components are included as examples and are not meant to be limiting.

As already mentioned above, boots, and, thus, also rolling boots in accordance with the present disclosure, can be manufactured of thermoplastic elastomer material or any other kind of elastomer material, especially a rubber elastomer material, or mixtures thereof. Advantages are provided by thermoplastic elastomer materials. These includes materials known from the prior art that have two different polymer segments, namely a relatively rigid resin segment and an elastic soft segment. The individual polymer segments are comprised of longer chains of similar monomers. The resin segments hold the soft segments together by physical, network-like bonds. A thermoplastic elastomer material (TPC-ET) for manufacturing rolling boots in accordance with the present disclosure is the thermoplastic material market under the brand name "Hytrel" by the DuPont Company.

The rolling boot in accordance with the present disclosure can be produced by way of a pressblower injection blow moulding process, but may also be produced with an injection/intrusion process, an injection moulding process, an injection/pressing process, and/or an extrusion/blow moulding process.

Figure 1:
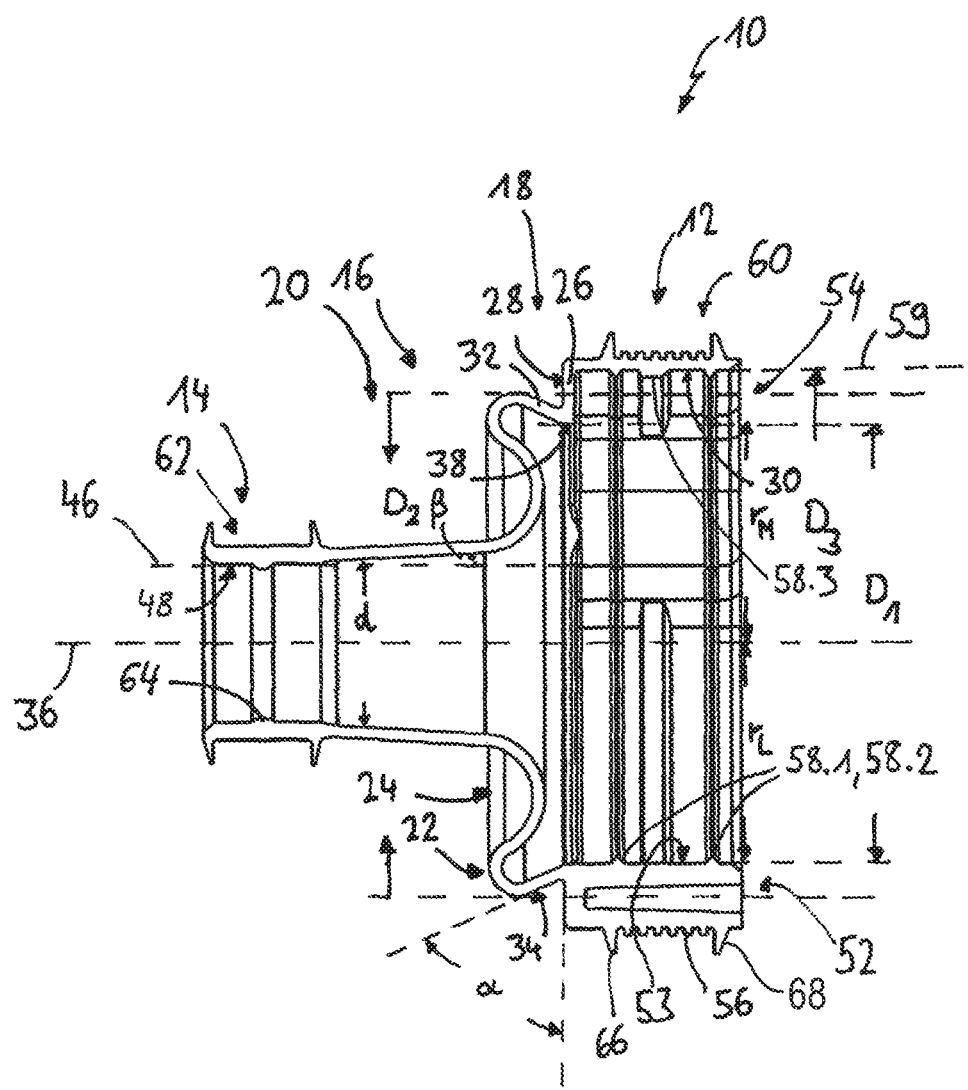
FIG. 1: A sectional view along a longitudinal main axis 36 of a first embodiment.

Referring now to the drawings where alike reference numerals are used to identify identical components in the various views, FIG. 1 illustrates a sectional view along a longitudinal main axis 36 of a first embodiment of a rolling boot 10. Said rolling boot 10 comprises a first fastening region 12 for fixing the boot 10 to a joint casing (not shown), and a second fastening region 14 for fastening the boot 10 to the shaft (not shown). When the mounting boot 10 via the first fastening region 12 and the second fastening region 14 on a joint casing and shaft, respectively, binder elements, especially tensioning elements, are used.

The first fastening region 12 provides for a binder seat region 60, in which the binder element, especially tensioning element, may be placed. On the outside of said binder seat region 60, outer ribs 56 are located, providing for a binder seat surface, having all identical shape, e.g., a square-like shape in the longitudinal section as shown in FIG. 1. On the other side of the binder seat surface, inner ribs 58.1 and 58.2 are located, being at least in part arranged circumferentially in the first binder seat region 60. In un-lobe regions 54, in addition, an inner rib 58.3 is provided for that is not provided for in lobe regions 52. The boot 10 as shown in FIG. 1 is adapted to be mounted on a joint casing with a trilobe outer contour, and includes a trilobe inner contour for matching the joint casing. Thus, in use, rolling boot 10 is not in need of any additional adapter for mounting on a trilobe joint casing.

The second fastening region 14 provides for a second binder seat region 62 for arranging a second binder element, especially a tensioning element, for fixing the boot 10 on a shaft not shown. On the inside of the binder seat region 62, a circumferential rib 64 is located.

Both the first binder seat region 60 as well as the second binder seat region 62 are defined through earlike projections 66 and 68, respectively, being arranged alternately or facing each other throughout the circumference on the outside of the boot. The definition of the first as well as the second binder seat region 60 and 62, respectively, via projections 66 and 68, respectively, may also be achieved by any other kind of projection 66 and 68, for example, circumferential rib-like protrusions, or combinations of circumferential protrusions with earlike protrusions or protrusions of any other kind being not embodied continuously circumferentially on the outside of the boot 10.

Immediately neighbouring the first fastening region 12, encompassing the first binder seat region 60, is a first transition region 18, comprising a first flange 26 with an outer surface 28, and a second flange 32 with an outer surface 34, said second flange 32 having a conical shape if viewed in a longitudinal section along the main axis 36 of boot 10. As shown in FIG. 1, between the outer surface 28 of the first flange 26 and the outer surface 34 of the second flange 32, an angle α is defined, the angle α being 66°. The angle α can measure in a region between approximately 30° to 89.8°, e.g., in a region between approximately 56° to approximately 86°, further, e.g., in a region between approximately 60° to approximately 82°, and yet further, e.g., in a region between approximately 62° to approximately 80°. That is, the first flange of the transition region can be arranged at an essentially right angle with respect to an inner surface of the first fastening region.

A minimum radius $r_M$, derived from diameter $D_1$, measured with respect to a bottom 38 of first flange 26 of the first transition region 18, is identical to a smallest radius $r_L$ provided for by the lobe region 52 and the inner surface 30 of the first fastening region 12 thereof.

The first transition region 18 is followed by a fold region 16, comprising a first fold 22 having a convex, radial shape, and a second fold 24, having a concave, radial shape. A ratio between an inner radius $r_1$ of the first fold 22, and an inner radius $r_2$ of the second fold 24, is around 1:3 (see FIG. 3 for the definition of the inner radius $r_1$ and $r_2$). The ratio $r_1:r_2$ can be in a range of approximately 1:1 to approximately 1:40, e.g., in a range of approximately 1:2 to approximately 1:10. A maximal diameter $D_2$ defined by the first fold 22 according to a maximal distance of the same with respect to main axis 36, or, in other words, a maximal turning point of the same with reference to main axis 36, is greater than the diameter $D_1$. With reference to FIG. 1, the ratio $D_1:D_2$ can be between approximately 1:1.01 to approximately 1:1.25 when the diameters are viewed in a longitudinal direction along a main axis, e.g., The the ratio $D_1:D_2$ is about 1:1.08. The ratio between $D_1:D_3$ can be between approximately 65% to approximately 95%, e.g., a ratio of $D_1:D_3$ is about 82%, meaning that $D_1$ is about 82% of $D_3$.

Immediately neighbouring the fold region 16 is a second transition region 20 with a conical part 40. A straight 46 is defined by an inner surface 48 of the second fastening region 14, and defines, together with a straight defined by an inner surface 50 of a conical part 40, an angle β, being around 3°. The angle β can be in a range between approximately 0.5° to approximately 12°, more e.g., in a range between approximately 1° to approximately 10°, and most e.g., in a range between approximately 1.5° to approximately 7.5°.

Figure 12:
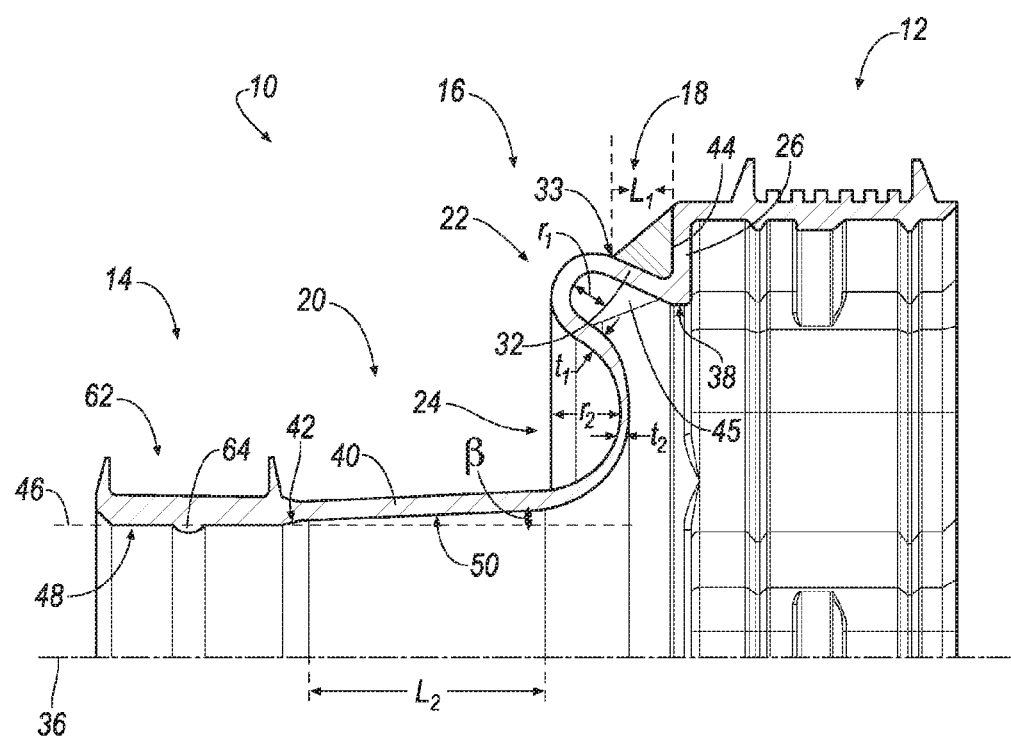
FIG. 12: a sectional view along a main axis of the embodiment of FIG. 3.

In a further embodiment, a thickness of the boot material varies from the first transition region 18 to the second transition region 20, as shown in FIG. 12. Thus, also the thickness of the boot material within the first transition region 18 and/or the second transition region 20 itself may vary. For example, the thickness varies in a region between approximately 0.5 mm to approximately 3 mm, preferred, e.g., in a region between approximately 0.8 mm to approximately 2 mm.

In a further embodiment, the thickness of the boot material decreases within the first fastening region 12. Further, e.g., the thickness of the boot material varies within the second fold 24. Yet further, e.g., a minimum of the thickness of the boot material lies within the second fold 24. As shown in FIG. 12, the thickness of the boot material starts at a thickness $t_1$ in the first fold 22 and decreases to a thickness $t_2$ within the second fold 24. As described above, the thickness $t_1$ may be approximately 3 mm and the thickness $t_2$ may be approximately 0.5 mm, such that the thickness of the boot material varies between approximately 0.5 mm to approximately 3 mm from the first transition region 18 to the second transition region 20.

Figure 5:
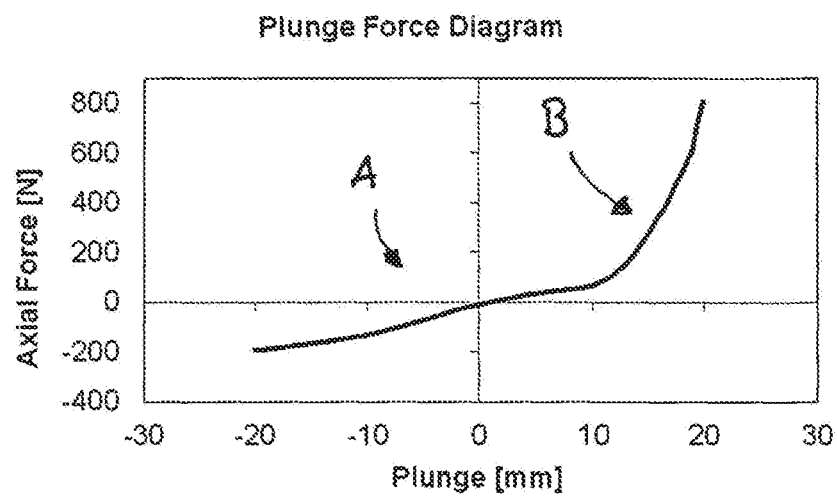
FIG. 5: an axial force-plunge-diagram of the boot in accordance with the first embodiment.

The variation of the thickness of the boot material, e.g., in the regions 18, 20 as defined before and shown in FIG. 12, allows a fine tuning of the retention force, and, thus, the form stability of the boot 10 claimed. The boot 10 in use provides for two different ranges of operation that may be measured and visualized in a force/path diagram. For example, as shown in FIG. 5, a first range A of operation exists, where in use the forces, especially the axial force, will only increase slightly, whereas a second range of operation B immediately neighbouring said first range of operation will be present in which the forces, especially the axial force, will increase drastically, practically ad infinitum. Due to said second range of operation B, the boot in accordance with the present disclosure will have the ability for axial centering of shafts in joints, especially plunge joints 70. The variation of the thickness of the boot material, especially in the regions 18, 20 as mentioned before, will allow also a fine tuning of said force/path abilities, i.e., of the first and the second range of operation, of the claimed boot 10.

Further, the conical part 40 of said second transition region 20 has a decreasing diameter d if viewed from the fold region 16 towards the second fastening region 14.

A ratio between a length $L_1$ of the first transition region 18 and a length $L_2$ of the second transition region 20 is about 1:4.3. Length $L_1$ is measured between the surface 28 of first flange 26 and an end region 33 of second flange 32 (see FIG. 3 for the definition of length $L_1$). The end region 33 is defined as the region where the second flange 32 ends, before it passes into the fold region 16 with the first fold 22 and the curved parts thereof. Length $L_2$ is measured between a transition 42 between the second fastening region 14 and the second transition region 20, namely, between an end of said transition 42 contacting said conical part 40 and the end of said conical part 40 that is followed by a second flange 24, namely, before the curvature of said second fold 24 starts. The transition from the second transition region 20 to the second fastening region 14 is essentially continuous.

Figure 2:
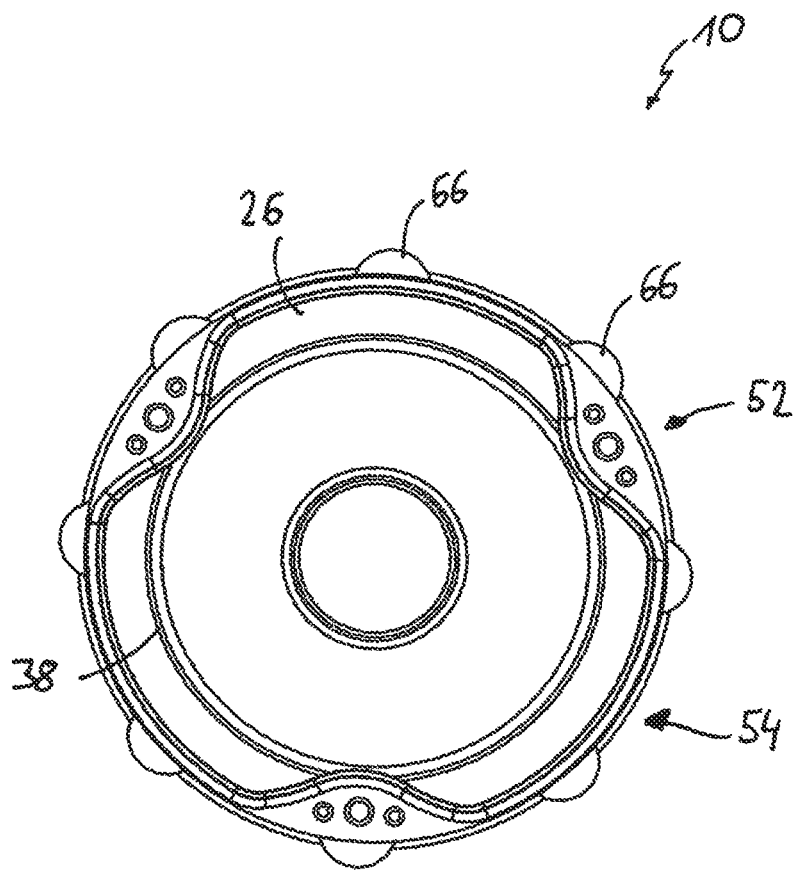
FIG. 2: a front outer view of a backside of the first embodiment.

FIG. 2 is a front outer view of the first embodiment of the rolling boot 10 in accordance with FIG. 1, from which especially the earlike projections 66 defining the first binder seat region of the first fastening region 12, and being alternatively arranged around the circumference on the outer side of the boot 10, are apparent. Further, especially also the rim provided for by the first flange 16 and its bottom 38 is apparent (see FIG. 3 for the definition of $L_2$).

Figure 3:
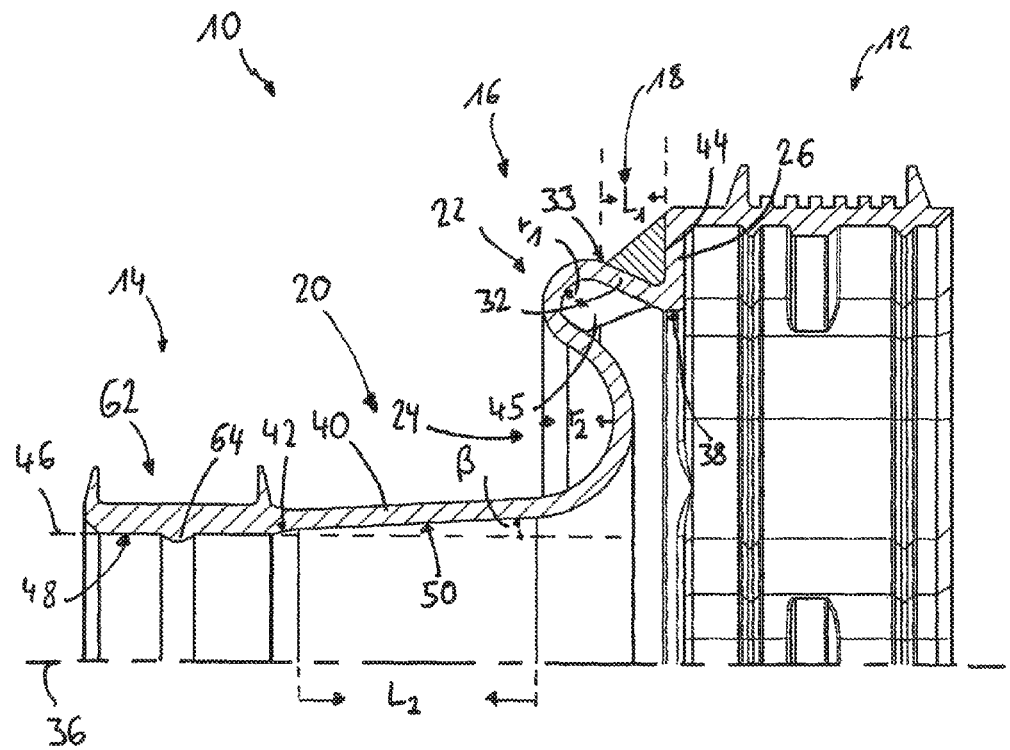
FIG. 3: an enlarged partial sectional view along a main axis (36) of a second embodiment with reinforcing ribs.

FIG. 3 is an enlarged partial sectional view of a back side along the main axis 36 of a second embodiment, differing mainly from the first embodiment by the incorporation of outer ribs 44 between the first flange and the second flange of the first transition region 18, and inner reinforcing ribs 45, arranged within the first fold 22 or fold region 16 and the inside surface of second flange 32. Said reinforcing outer and inner ribs 44 and 45 may be arranged alternatively around the circumference of the boot, similar to the earlike projections 66 defining the first binder seat region 60 of first fastening region 12, as shown in FIG. 2.

Figure 4:
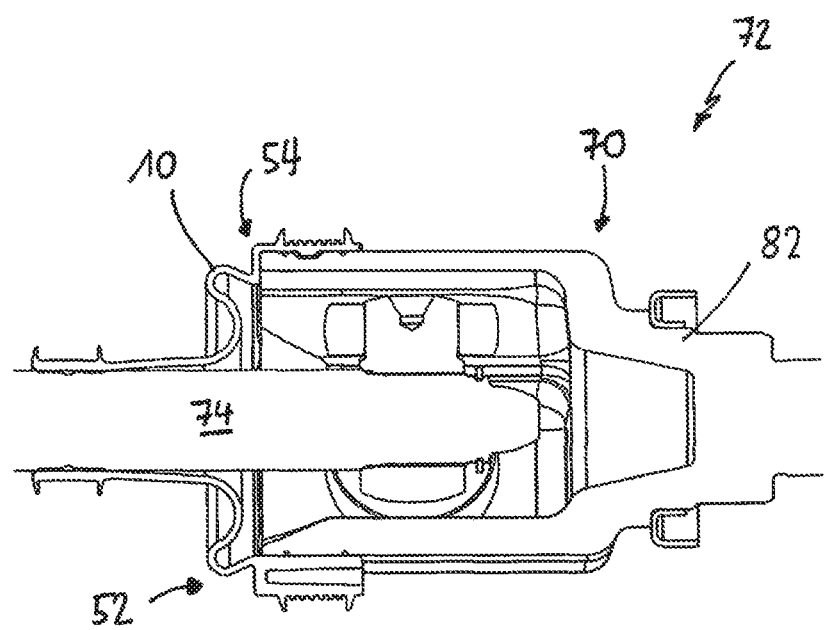
FIG. 4: a joint arrangement in accordance with a third embodiment.

FIG. 4 shows a joint arrangement in part in accordance with a third embodiment, including a shaft 74 being mounted in a joint arrangement 72 with a plunge joint 70 with a casing 82, and a boot 10. No binder element for fixing the boot 10 on the plunge joint 70 is shown in FIG. 4. Boot 10 is not mounted under tension. It can be seen that the bottom 38 of first flange 26 of the first transition region protrudes the front edge of the plunge joint 70 in the un-lobe regions 54, whereas no such protuberance are present in the lobe regions 52.

FIG. 5 is an axial force-plunge path-diagram of the boot, showing two different ranges of operation, namely a first range of operation A where a movement of about 25 mm only leads to a small increase of the axial force, whereas in a second range of operation B, a drastic increase of the axial force over a length of less than 7 mm occurs. In the second range of operation, the boot is fully extended at the end. In this position, the boot is still in a position to provide for axial centering of a shaft within a joint, and, further, avoids disassembly of the inner parts of the joint. The axial force-plunge-path-diagram was measured by carrying out pull-off tests of the boot in question using a Pull-Pressure-Apparatus of Carl Schenk AG, Darmstadt, Germany. The measurements were carried out at a temperature of 30° C.+−10° C. with a pulling speed of 10 mm/min, the boot being mounted on a plunge joint.

Figure 6:
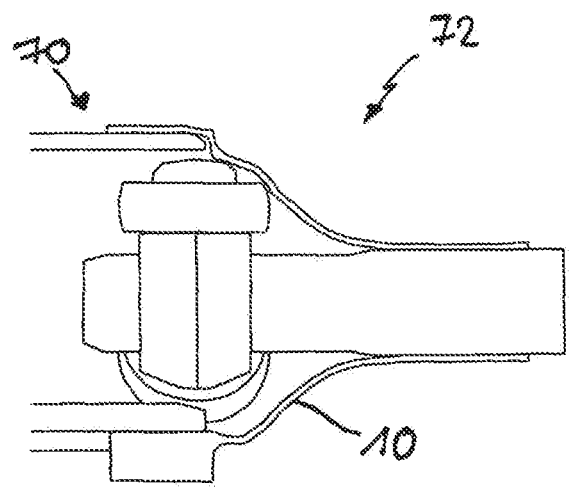
FIG. 6: a joint arrangement in accordance with the present disclosure with the boot in accordance with the first embodiment in a fully extended plunge position in a sectional view.

FIG. 6 shows a joint arrangement 72 with the boot 10 in a fully extended position, where the shaft (not shown) is moved towards an un-lobe region of the joint. One may see from FIG. 6 that the first and second fold 22 and 24, respectively, show nearly no curvature at all, meaning that radii $r_1$ and $r_2$ extend practically ad infinitum, i.e., the first and second folds 22 and 24 are substantially flat. A disassembly of the joint 70 will be prevented due to the progressively increasing axial force, going up to a maximum value (e.g., practically ad infinitum).

Figure 7:
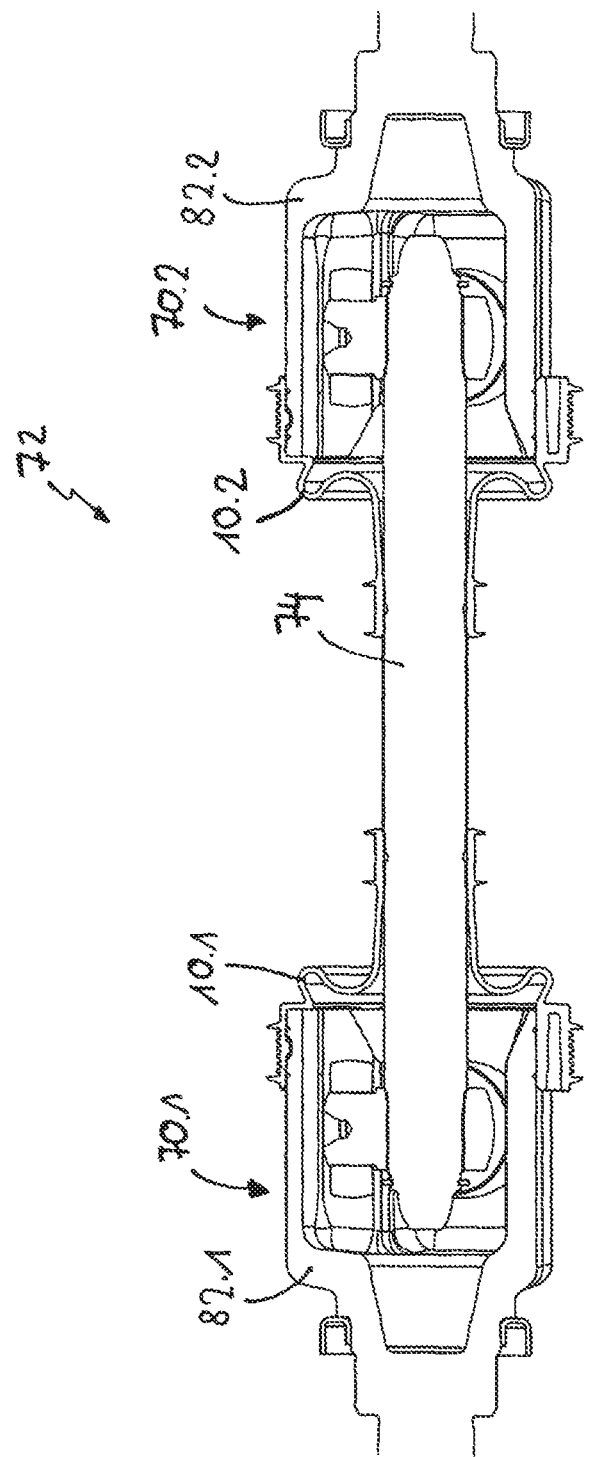
FIG. 7: a joint arrangement in accordance with a fourth embodiment in a sectional view.

FIG. 7 shows a joint arrangement in accordance with a fourth embodiment, showing a shaft 74 assembled with two tripode plunge joints 70.1 and 70.2. Rolling boots 10.1 and 10.2 are mounted without any tension on joint casings 82.1 and 82.2, respectively. Axial movement and retention force is, thus, distributed in an essentially equal way on each of the rolling boots 10.1, and 10.2, respectively. The shaft 74 is axially centered within the plunge joints 70.1 and 70.2 due to the high retention forces imparted by boots 10.1 and 10.2, respectively.

Figure 8:
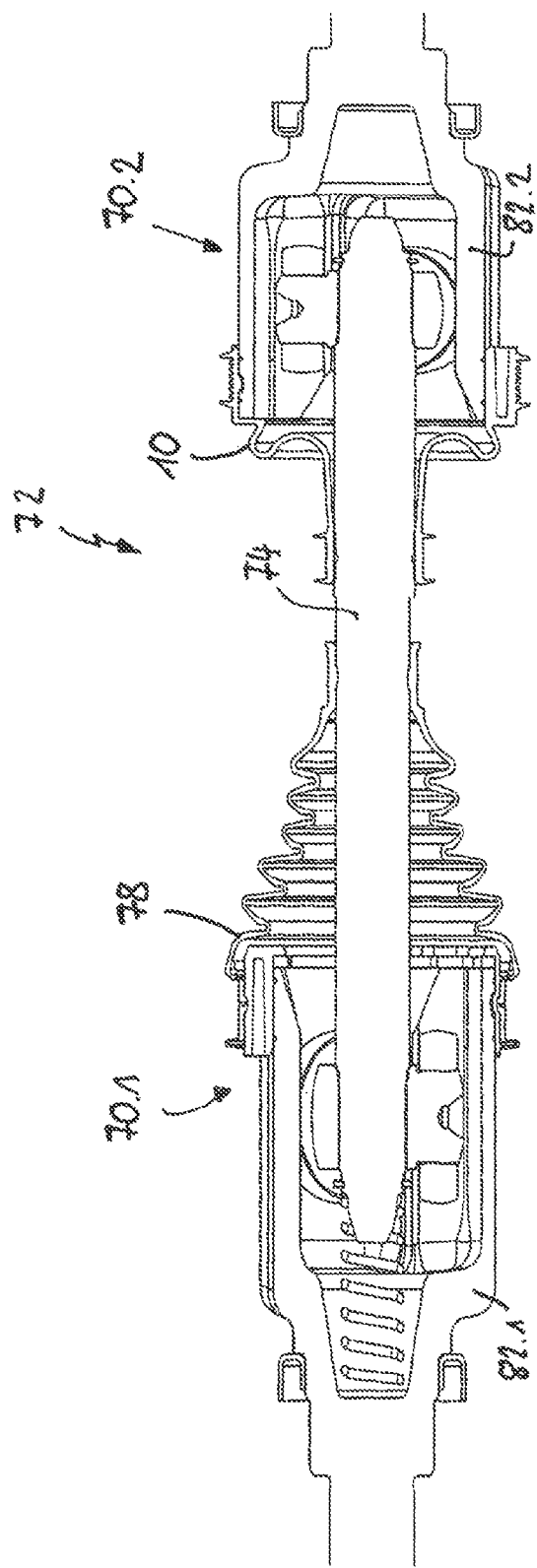
FIG. 8: a joint arrangement in accordance with a fifth embodiment in a sectional view.

FIG. 8 shows a joint arrangement in accordance with a fifth embodiment, where a shaft 74 is assembled with two tripode plunge joints 70.1 and 70.2. However, a convolute boot 78 is mounted on a joint casing 82.1 of plunge joint 70.1 as well as on shaft 74, whereas a rolling boot 10 is mounted on joint casing 82.2 of plunge joint 70.2. By said joint arrangement 72, it is achieved that, due to the increased form stability, and especially the increased retention force, of the rolling boot 10, the plunge joint 70.2 may only carry out no or small axial movements, and is, thus, acting similarly to a fixed joint.

Figure 9:
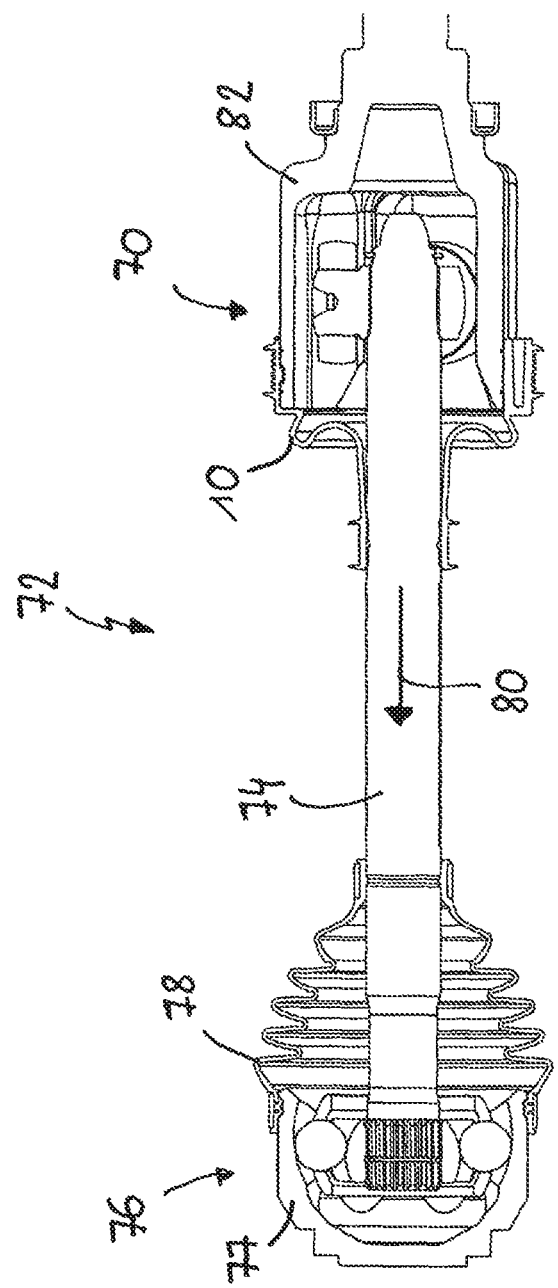
FIG. 9: a joint arrangement in accordance with a sixth embodiment in a sectional view.

FIG. 9 shows a joint arrangement in accordance with a sixth embodiment, where a shaft•74 is assembled with a fixed joint 76·having a joint casing 77 and a tripode plunge joint 70. A boot 10 is mounted on the tripode plunge joint 70 on the joint casing 82 thereof, whereas a convolute boot 78 is mounted on the fixed joint 76. Said joint arrangement 72 will provide for a force as shown by arrow 80 from the plunge joint 70 to the fixed joint 78 due to the higher form stability and retention force of boot 10. The boot 10 is mounted under tension. Also, the convolute boot 78 may be mounted under tension; however, the tension acting on boot 10 must be higher than the tension acting on boot 78. In said joint arrangement 72, at least in part the axial movement of shaft 74 in the fixed joint 76 will be compensated, due to the force acting on the fixed joint 76.

Figure 10:
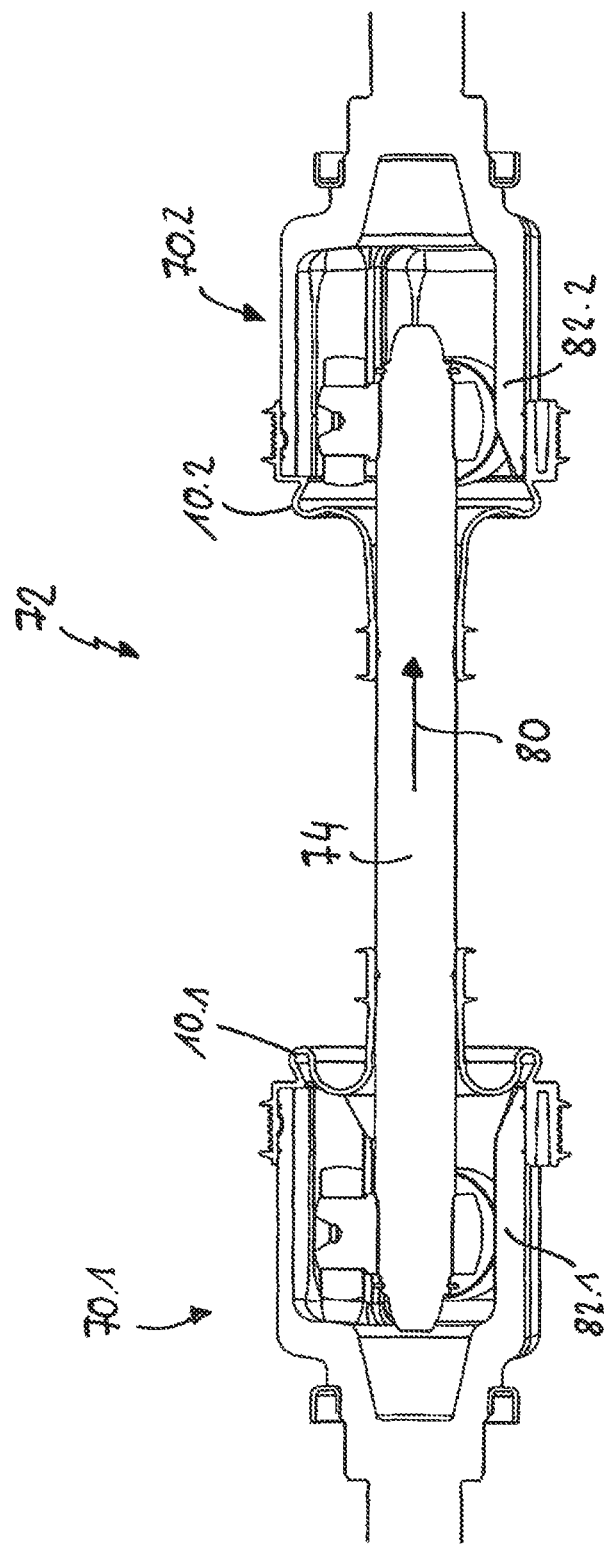
FIG. 10: a joint arrangement in accordance with a seventh embodiment in a sectional view.

FIG. 10 shows a further joint arrangement in accordance with a seventh embodiment. Said joint arrangement 76 includes a shaft 74, assembled with two tripode plunge joints 70.1 und 70.2. Two boots 10.1 and 10.2 are mounted on joint casings 82.1 und 82.2, respectively, as well as on shaft 74. However, boot 10.1 is mounted under tension with a shortened length, whereas boot 10.2 of plunge joint 70.2 is mounted with an increased length, namely, in an expanded way. Thus, due to said mounting of boots 10.1 and 10.2 under tension, an axial force will act on plunge joint 70.2, as shown by arrow 80. As is the case in the arrangement in accordance with FIG. 9, thus, an axial centering as well as a pretension of the shaft will be achieved. Shaft 74 is shown in FIG. 10 in a retracted end position in plunge joint 70.2.

Figure 11:
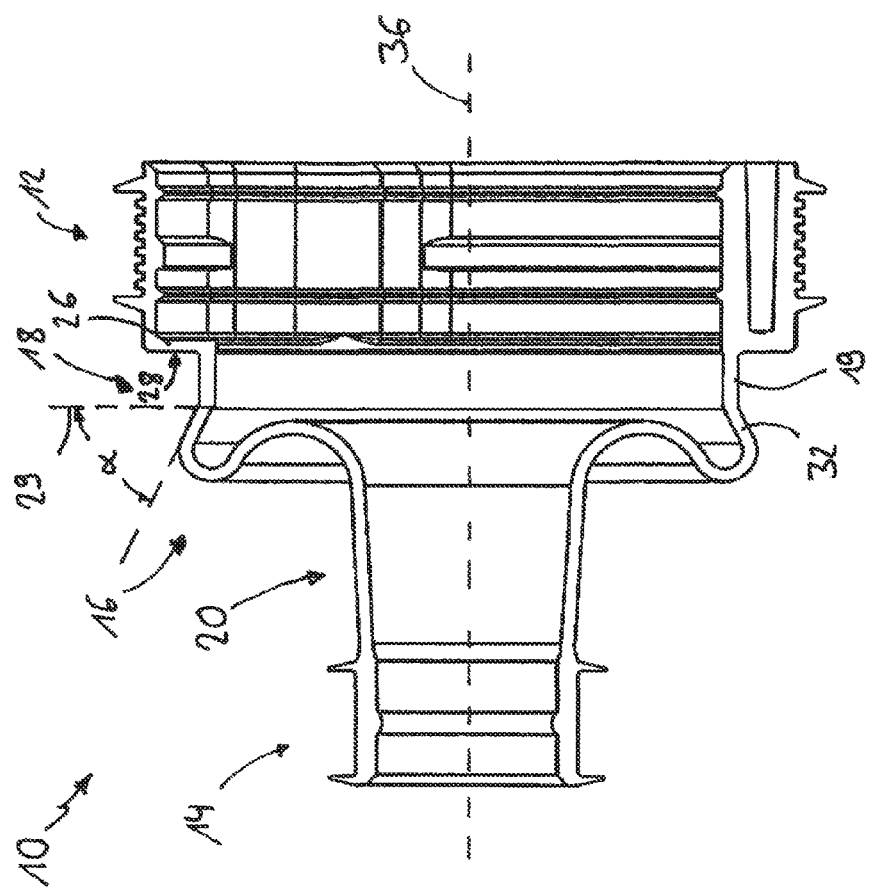
FIG. 11: a sectional longitudinal view along a main axis 36 of an eighth embodiment.

FIG. 11 shows an eighth embodiment, namely a rolling boot 10, where the first transition region 18 also encompasses a cylindrical part 19 between the first flange 26 and the second flange 32. Thus, in order to measure angle α, a parallel 29 is laid at the beginning of second flange 32, being parallel to the outer surface 28 of first flange 26. In fact, one may say that in order to have angle α measured in embodiments as shown in FIG. 11, simply a straight being defined by outer surface 28 of first flange 26 must be adjoined towards the starting point of second flange 32.

The present disclosure consequently includes a rolling boot which through the special design of its first transition region advantageously provides for a higher form stability, and especially higher retention forces, of a boot in a joint arrangement using said boot. A fine tuning of the form stability and/or retention force is possible by a variation of the thickness of the boot material to be used, especially in certain regions of the boot in accordance with the disclosure, as well as with respect to the geometry of the first and second fold of the fold region.

While the present rolling boot has been described in connection with one or more embodiments, the disclosure is not meant to be limiting. Rather, the disclosure covers all alternatives, modifications, and equivalents within the scope and spirit of the appended claims, taking into account the description above.

The invention claimed is:

1. A rolling boot, comprising:
a first fastening region arranged to fasten to a joint casing;
a second fastening region arranged to fasten to a shaft; and
a fold region between the first and the second fastening regions with a first fold proximate to the first fastening region and a second fold proximate to the second fastening region; and
a first transition region located between the first fastening region and the first fold, the first transition region comprising a first flange that has a bottom neighboring the first fastening region;
wherein a ratio between a first minimal diameter $D_1$, defined by the bottom of the first flange of the first transition region, and a second maximal diameter $D_2$, defined by the first fold, is between approximately 1:1.01 to approximately 1:1.25 when the diameters are viewed in a longitudinal direction along a main axis;
wherein the first flange of the transition region is arranged at an essentially right angle with respect to an inner surface of the first fastening region.

2. The rolling boot of claim 1, wherein, at least in part with respect to a circumference of the boot, an angle α measured between an outer surface of one of the first flange of the boot and a parallel thereof, and an outer surface of a second flange of the boot having a conical shape, if viewed in a longitudinal direction along a main axis of the boot, measures in a range of approximately 30° to 89.8°.

3. The rolling boot of claim 2, wherein the angle α is between approximately 56° to approximately 86°.

4. The rolling boot of claim 1, further comprising, between the second fold and the second fastening region, a second transition region having a conical part with a decreasing diameter in a direction toward the second fastening region.

5. The rolling boot of claim 4, wherein a transition from the second transition region to the second fastening region is essentially continuous.

6. The rolling boot of claim 4, wherein an angle β, measured between a straight defined by an inner surface of the second fastening region and an inner surface of the conical part of the second transition region, is in a range of between approximately 0.5° to approximately 12°.

7. The rolling boot of claim 1, further comprising at least an inner and/or outer reinforcing rib located at one of between the first fold and the first transition region, within the first fold, and between the first and the second fold within the boot.

8. The rolling boot of claim 1, wherein a thickness of the boot material from the first transition region to a second transition region varies.

9. The rolling boot of claim 8, wherein the thickness varies between approximately 0.5 millimeters to approximately 3 millimeters.

10. The rolling boot of claim 8, wherein the thickness varies within the second fold.

11. The rolling boot of claim 1, wherein the first fold is of convex shape.

12. The rolling boot of claim 1, wherein the second fold is of concave shape.

13. The rolling boot of claim 1, wherein a ratio of the inner radius $r_1$ of the first fold and an inner radius $r_2$ of the second fold is in a range of approximately 1:1 to approximately 1:40.

14. The rolling boot of claim 1, wherein a ratio between the first minimal diameter $D_1$ and a third diameter $D_3$, defined by a straight, the straight being defined by an inner surface of the first fastening region of a first binder seat region of the boot, is between approximately 65% to approximately 95%.

15. The rolling boot of claim 1, wherein at a maximal plunge the second fold is substantially flat so that a progressively increasing axial force of said boot prevents a disassembly of a joint on which the boot may be fixed.

16. A plunge joint, comprising:
a joint casing; and
the rolling boot of claim 1.

17. A joint arrangement with at least one rolling boot of claim 1, the joint arrangement further comprising at least one plunge joint, and a shaft.

18. The joint arrangement of claim 17, wherein the at least one rolling boot is mounted under tension.

\* \* \* \* \*